US011616713B2

(12) United States Patent
Gupta et al.

(10) Patent No.: US 11,616,713 B2
(45) Date of Patent: *Mar. 28, 2023

(54) NEXT GENERATION NETWORK MONITORING ARCHITECTURE

(71) Applicant: AT&T INTELLECTUAL PROPERTY I, L.P., Atlanta, GA (US)

(72) Inventors: Gagan Raj Gupta, Raipur (IN); Pradeep Kunjunny, Sammamish, WA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/556,915

(22) Filed: Dec. 20, 2021

(65) Prior Publication Data
US 2022/0116302 A1 Apr. 14, 2022

Related U.S. Application Data

(63) Continuation of application No. 16/943,953, filed on Jul. 30, 2020, now Pat. No. 11,206,205.

(51) Int. Cl.
*H04L 43/12* (2022.01)
*H04L 43/08* (2022.01)
*H04L 41/0893* (2022.01)

(52) U.S. Cl.
CPC .......... *H04L 43/12* (2013.01); *H04L 41/0893* (2013.01); *H04L 43/08* (2013.01)

(58) Field of Classification Search
CPC ...... H04L 43/12; H04L 41/0893; H04L 43/08
See application file for complete search history.

(56) References Cited

U.S. PATENT DOCUMENTS

| 2010/0299173 | A1* | 11/2010 | Zampiello | ............. H04W 24/08 705/344 |
| 2019/0230112 | A1* | 7/2019 | Gandham | ........... H04L 41/0886 |
| 2020/0183603 | A1* | 6/2020 | Takla | ..................... G06F 13/362 |

OTHER PUBLICATIONS

Stuart Scott, AWS Global Infrastructure: Availability Zones, Regions, Edge Locations, Regional Edge Caches, Jul. 10, 2017 (Year: 2017).*

(Continued)

*Primary Examiner* — John A Follansbee
*Assistant Examiner* — Fadi Haj Said

(57) ABSTRACT

A stream processing system in a first zone of a telecommunication network may obtain at least one policy for processing trace data of virtual network functions (VNFs) in the first zone, and obtain the trace data of the VNFs from a data distribution platform of the telecommunication network, where the trace data is published in accordance with a topic to the data distribution platform by the VNFs, and where the stream processing system comprises a subscriber to the topic. The first stream processing system may additionally forward at least a first portion of the trace data to a second stream processing system of the telecommunication network in accordance with the at least one policy, where the first portion comprises less than all of the trace data, and where the second stream processing system is for a region of the telecommunication network that includes the first zone and a second zone.

20 Claims, 6 Drawing Sheets

(56) References Cited

OTHER PUBLICATIONS

Onap, "Container Based Network Service/Function Deployment", Dublin Documentation, Aug. 21, 2019, Printed on May 21, 2021 from https://docs.onap.org/en/dublin/submodules/multicloud/framework.git/docs/spec/multicloud-conatiner-plugin.html., 11 pages.

Dashboard, Casablanca (R3), Platform Component Architecture, Data Collection, Analytics and Events (DCAE), Oct. 30, 2017, printed on May 21, 2021 from https://wiki.onap.org/pages/viewpage.action?pageId=1015831, 11 pages.

Intel, "Enea's* Qosmos* NFV Probe Uses Intel® CPUS for NFV Network Troubleshooting", Solution Brief, downloaded from http://blogs.cisco.com/security/trends-is-data-center-security-part-1-traffic-trends on Sep. 9, 2021, 4 pages.

Qa Café, "Five Reasons to Move to the Pcaping Capture Format", accessed from https://qacafe.com/resourses/5-reasons-to-move-to-pcaping, on Sep. 9, 2020, printed on May 24, 2021, 4 pages.

Jaszczyk, P. "High Volume VES Collector", Dashboard, DCAE MS Components Info , Sep. 28, 2018, printed from https://wiki/onap.org/display/DW/High+Volume+VES+Collector on May 21, 2021, 4 pages.

"High-level architecture of HV-VES", Dublin Documentation, Aug. 21, 2019, printed from https://docs.onap.org/en/dublin/submodules/dcaegen2.git/docs/sections/services/ves-hv/architecture.html, on May 21, 2021, 2 pages.

"Spark Streaming Programming Guide", Spark 3.1.1 Documentation, accessed on Sep. 9, 2020, from https://spark/apache.org/docs/lastest/streaming-programming=guide.html, printed on May 24, 2021, 27 pages.

Structured Streaming Programming Guide [Alpha], Spark 2.1.2 Documentation, accessed on Sep. 9, 2020 from https://spark.apache.org/docs/2.1.2/structured-streaming-programming-guide.html, downloaded on May 24, 2021., 27 pages.

Kaiser, G., "The network probe is dead. Long live the probe!", Dynatrace news, Jan. 11, 2018, printed from https://dynatrace.com/news/blog/the-network-probe-is-dead-long-live-the-probe, 11 pages.

* cited by examiner

NEXT GENERATION NETWORK MONITORING ARCHITECTURE

The present disclosure relates generally to network probing, and more particularly to methods, computer-readable media, and apparatuses for processing trace data of virtual network functions of a telecommunication network via a plurality of stream processing systems.

BACKGROUND

Probing and troubleshooting in telecommunication networks are currently monolithic, inflexible, and closed. A network service provider may invest in building a parallel passive probe infrastructure to monitor network functions, yet current infrastructure does not scale well. Current probe infrastructure may consume a significant fraction of cellular core network resources (e.g., up to 30 percent or more for virtualized networks). In addition, with next generation cellular networks entering deployment, the amount of network data on control plane is anticipated to increase tenfold. However only a fraction of such data may ever be used by network operations personnel or automated systems. Furthermore, it may be beneficial to monitor the network traffic in real time, but real time monitoring further increases the complexity and computational cost for the network service provider.

SUMMARY

Methods, computer-readable media, and apparatuses for processing trace data of virtual network functions of a telecommunication network via a plurality of stream processing systems are described. For instance, in one example, a first stream processing system including at least one processor deployed in a first zone of a telecommunication network may obtain at least one policy for processing trace data of a plurality of virtual network functions in the first zone, and obtain the trace data of the plurality of virtual network functions in the first zone, where the trace data is obtained from a data distribution platform of the telecommunication network, where the trace data is published in accordance with a topic to the data distribution platform by the plurality of virtual network functions, and where the first stream processing system comprises a subscriber to the topic. The first stream processing system may additionally forward at least a first portion of the trace data to a second stream processing system of the telecommunication network in accordance with the at least one policy, where the at least the first portion comprises less than all of the trace data, and where the second stream processing system is for a region of the telecommunication network that includes the first zone and at least a second zone.

BRIEF DESCRIPTION OF THE DRAWINGS

The teachings of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

This present disclosure describes methods, computer-readable media, and apparatuses for processing trace data of virtual network functions of a telecommunication network via a plurality of stream processing systems. In particular, examples of the present disclosure configure network functions to provide trace data (or "probe data"), which may comprise logs, events, packets, and metadata for correlation. Examples of the present disclosure enable priority-based processing of events and packets, and different classes of service for trace data processing per-event, based on business logic. In addition, examples of the present disclosure provide a new standard event and packet format, and enforce network functions to enrich the events and packets with descriptive metadata. Thus, it is not necessary to process each and every packet to build correlation tables.

Figure 2:
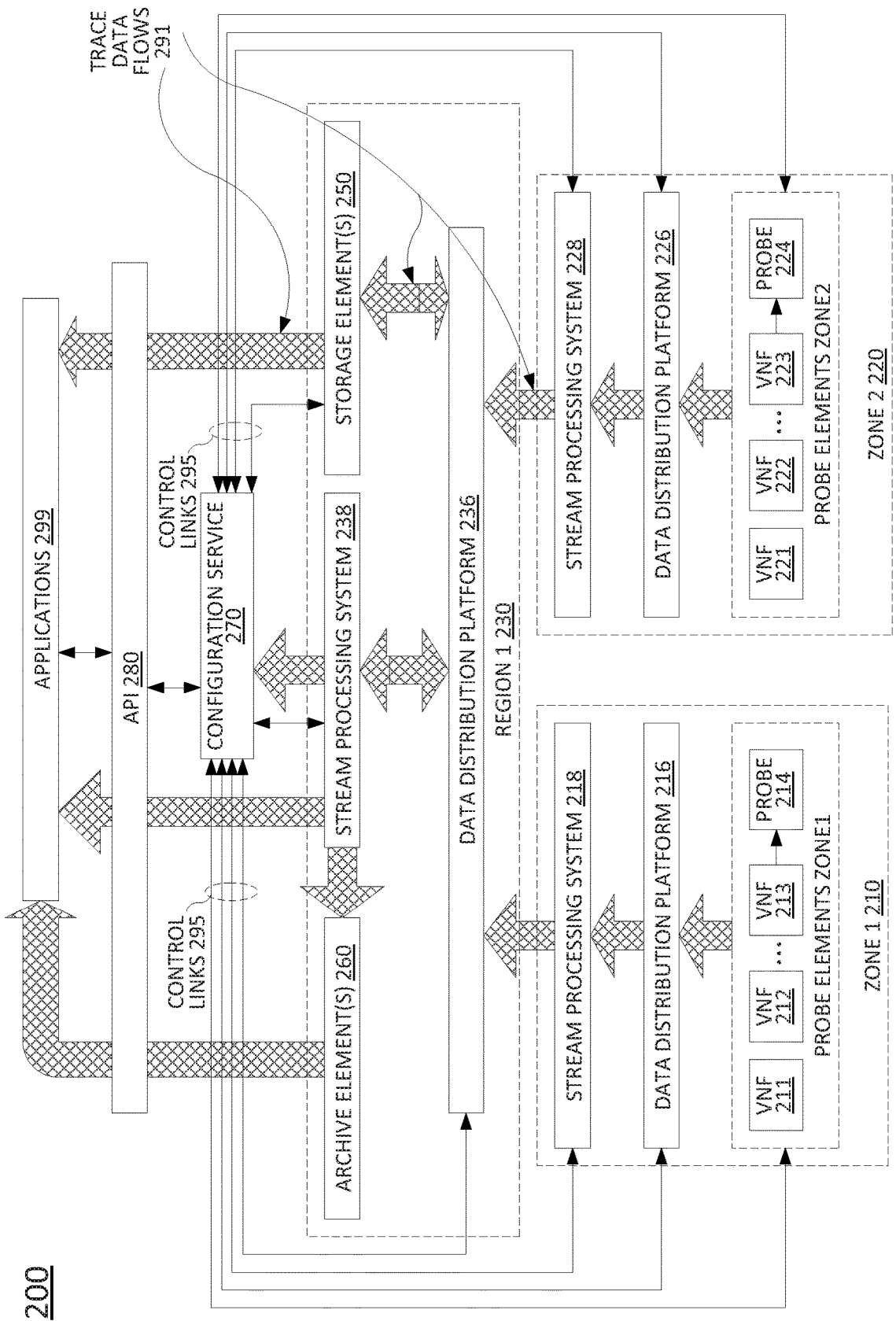
FIG. 2 illustrates an example hierarchical probe architecture for a telecommunication network, in accordance with the present disclosure.

In one aspect, the present disclosure may comprise a probing architecture in which virtual network functions (VNFs) are configured as the primary source of probing information (trace data). In such case, the architecture avoids spinning-up/creating dedicated probe elements except for troubleshooting native VNF issues (e.g., during new turn-up/deployment of a VNF and/or for targeted troubleshooting of a VNF, such as when the VNF's basic functionalities are compromised). In practice, one or several probe elements may be maintained at some capacity, and which may remain available for mirroring/forwarding on-demand. In addition, the probe architecture of the present disclosure is scalable, fault-tolerant, and distributed. For example, in one example, data may be collected and written to a "shared message bus," or data distribution platform, e.g., Apache Kafka, Apache Pulsar, or the like. In addition, the probe architecture may include a plurality of such data distribution platforms, e.g., for different zones, regions, etc. An example of a distributed hierarchical probe architecture for a telecommunication network is illustrated in FIG. 2 and described below. It should also be noted that in accordance with the present disclosure, the term "virtual network function" (or "VNF"), may refer to both virtual machine (VM)-based VNFs, e.g., VNFs deployed as VMs, and containerized or container-based (VNFs), e.g., VNFs deployed as containers, such as within a Kubernetes infrastructure, or the like, also referred to as "cloud-native network functions" (CNFs). In accordance with the present disclosure, where multiple containers hosting "microservices" may be coordinated to collectively provide a "service," each such component "microservice" may be referred to as a VNF.

In one example, the present disclosure incorporates open standard formats/application programming interfaces (APIs) for measurements and trace data transfers. This includes exports in uniform protocols/formats, which are vendor and platform agnostic. Similarly, in one example, all trace data is stored in open databases, or "data lakes," with open schemas and data formats. To deliver session related events, the present disclosure defines an extension of Open Network Automation Platform (ONAP) High Volume Virtual Event Streaming (HV-VES) event format schema/format to include primary keys and secondary keys used in troubleshooting. All trace data that is generated, transformed, stored, etc. is enforced to remain compatible with this schema. This extended format may be referred to as CVES-HV herein (e.g., Core VNF Event Streaming-High Volume). In one example, VNFs report critical conditions (restart, memory overflow, overload, sampling triggered, etc.) in the CVES-HV format. In one example, packets (e.g., mirrored packets that comprise trace data) are encapsulated in PCAP ("packet capture") API Next Generation (PCAP-NG) format, with additional metadata fields as described herein.

Examples of the present disclosure also include plug-and-play ability for analytics and tracing. As such, a telecommunication network operator may select the best solution for different aspects of the probe architecture, including: packet acquisition, troubleshooting apps, analytics, load balancing, storage, and so forth. As described herein, VNF-based trace data (probe data) may include events, logs, packets, and/or performance indicators (e.g., "key performance indicators" (KPIs)). Collection and/or generation of trace data may be configured on VNFs for all user equipment (UE), specific UEs (e.g., identified by International Mobile Subscriber Identity (IMSI), or similar identifier) and/or specific users or subscribers, IMSI whitelists, etc., may be established with sampling (adaptive) rates, and so forth. In one example, whitelists, sampling, etc., may be configured via APIs provided by the probe architecture of the present disclosure. In one example, certain nodes (e.g., VNFs) on a control plane may provide full packet mirroring (e.g., one of the types of trace data being "packets").

In one example, the present disclosure provides for a single event format to cover all control messaging. However, the format is flexible to enable modification of the supported fields. In one example, trace data may be "tagged" by VNFs throughout the lifecycle of probe sessions to improve correlation. For instance, in one example, the present disclosure may incorporate $3^{rd}$ Generation Partnership Project (3GPP) Internet Protocol (IP) Multimedia Subsystem (IMS) call detail records (CDR) definitions. In one example, probe system components may query VNFs for keys via standardized interfaces.

In one example, the single event format may comprise Open Network Automation Platform (ONAP) Virtual Event Streaming (VES) event format with additional fields, wherein the additional fields are made to include mandatory fields of subscriber identity (SUCI), which may map to IMSI, MSISDN, or the like, for interworking. In one example, a common identifier and/or correlation identifier (ID), may be propagated to all VNFs (and/or other network functions, such as physical network functions (PNFs) that may be involved in a session or other transaction, such that the trace data may be correlated by the probe infrastructure. These and other aspects of the present disclosure are discussed in greater detail below in connection with the examples of FIGS. 1-6.

Figure 1:
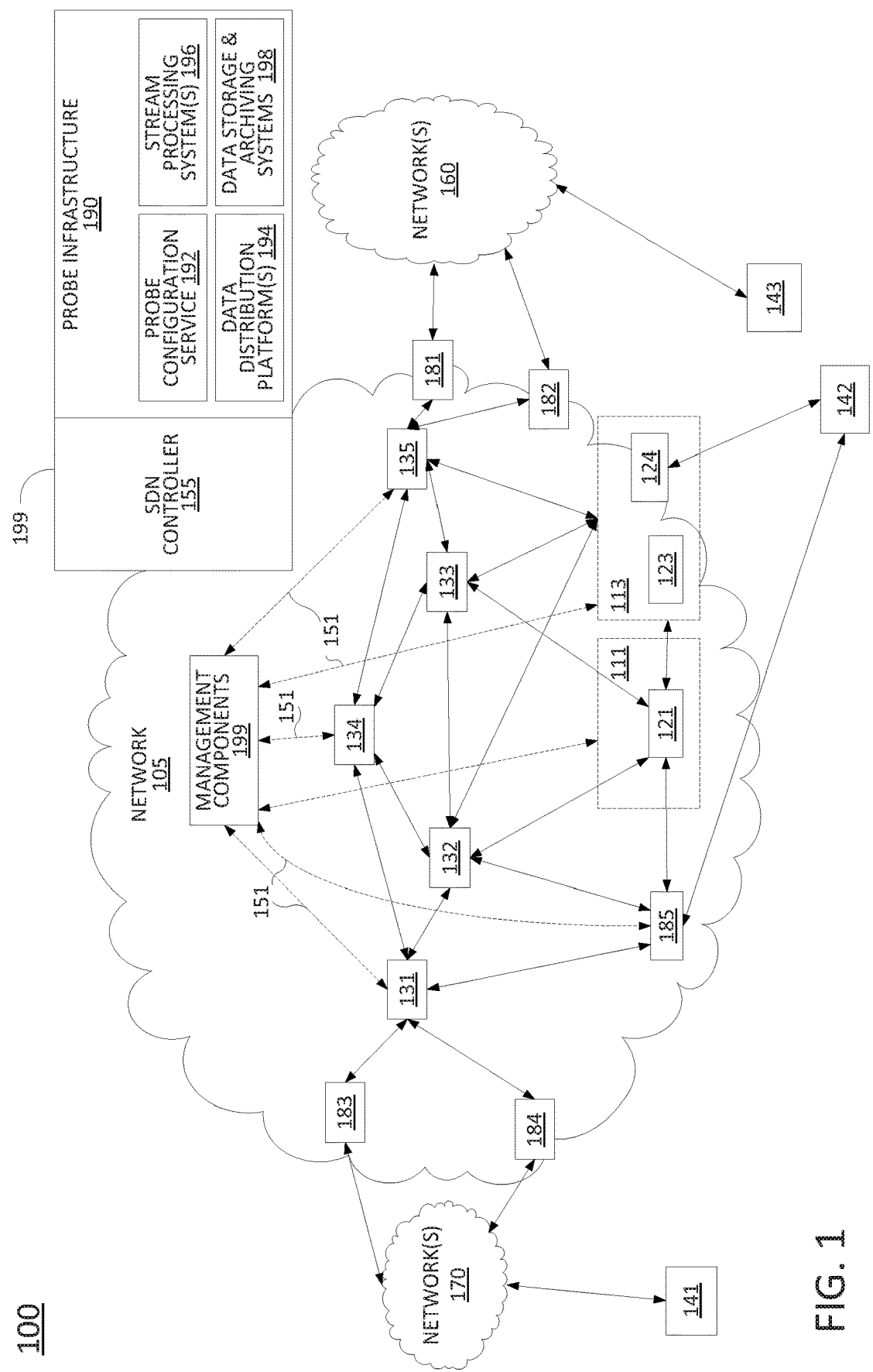
FIG. 1 illustrates an example system related to the present disclosure.

To aid in understanding the present disclosure, FIG. 1 illustrates a block diagram depicting one example of a communications network or system 100 for performing or enabling the steps, functions, operations, and/or features described herein. The system 100 may include any number of interconnected networks which may use the same or different communication technologies. As illustrated in FIG. 1, system 100 may include a network 105, e.g., a core telecommunication network. In one example, the network 105 may comprise a backbone network, or transport network, such as an Internet Protocol (IP)/multi-protocol label switching (MPLS) network, where label switched paths (LSPs) can be assigned for routing Transmission Control Protocol (TCP)/IP packets, User Datagram Protocol (UDP)/IP packets, and other types of protocol data units (PDUs) (broadly "traffic"). However, it will be appreciated that the present disclosure is equally applicable to other types of data units and network protocols. For instance, the network 105 may alternatively or additional comprise components of a cellular core network, such as a Public Land Mobile Network (PLMN), a General Packet Radio Service (GPRS) core network, and/or an evolved packet core (EPC) network, a 5G core network, an Internet Protocol Multimedia Subsystem (IMS) network, a Voice over Internet Protocol (VoIP) network, and so forth. In one example, the network 105 uses a network function virtualization infrastructure (NFVI), e.g., servers in a data center or data centers that are available as host devices to host virtual machines (VMs) and/or containers comprising virtual network functions (VNFs). In other words, at least a portion of the network 105 may incorporate software-defined network (SDN) components.

In this regard, it should be noted that as referred to herein, "traffic" may comprise all or a portion of a transmission, e.g., a sequence or flow, comprising one or more packets, segments, datagrams, frames, cells, PDUs, service data units, bursts, and so forth. The particular terminology or types of data units involved may vary depending upon the underlying network technology. Thus, the term "traffic" is intended to refer to any quantity of data to be sent from a source to a destination through one or more networks.

In one example, the network 105 may be in communication with networks 160 and networks 170. Networks 160 and 170 may each comprise a wireless network (e.g., an Institute of Electrical and Electronics Engineers (IEEE) 802.11/Wi-Fi network and the like), a cellular access network (e.g., a Universal Terrestrial Radio Access Network (UTRAN) or an evolved UTRAN (eUTRAN), and the like), a circuit switched network (e.g., a public switched telephone network (PSTN)), a cable network, a digital subscriber line (DSL) network, a metropolitan area network (MAN), an Internet service provider (ISP) network, a peer network, and the like. In one example, the networks 160 and 170 may include different types of networks. In another example, the networks 160 and 170 may be the same type of network. The networks 160 and 170 may be controlled or operated by a same entity as that of network 105 or may be controlled or operated by one or more different entities. In one example, the networks 160 and 170 may comprise separate domains, e.g., separate routing domains as compared to the network 105. In one example, networks 160 and/or networks 170 may represent the Internet in general.

In one particular example, networks 160 and 170 may comprise 5G radio access networks. For example, as illustrated in FIG. 1, the system 100 may represent a "non-stand alone" (NSA) mode architecture where 5G radio access network components, such as a "new radio" (NR), "gNodeB" (or "gNB"), and so forth are supported by a 4G/LTE core network (e.g., where network 105 represents an Evolved Packet Core (EPC) network). However, in another example, system 100 may instead comprise a 5G "standalone" (SA) mode point-to-point or service-based architecture where EPC components and functions of network 105 are replaced by a 5G core network, which may include an access and mobility management function (AMF), a user plane function (UPF), a session management function (SMF), a policy control function (PCF), a unified data management function (UDM), an authentication server function (AUSF), an application function (AF), a network repository function (NRF), and so on. In addition, these various components may comprise VNFs, as described herein.

In one example, network 105 may transport traffic to and from user devices 141-143. For instance, the traffic may relate to communications such as voice telephone calls, video and other multimedia, text messaging, emails, and so forth among the user devices 141-143, or between the user devices 141-143 and other devices that may be accessible via networks 160 and 170. User devices 141-143 may comprise, for example, cellular telephones, smart phones, personal computers, other wireless and wired computing devices, private branch exchanges, customer edge (CE) routers, media terminal adapters, cable boxes, home gateways and/or routers, and so forth.

In accordance with the present disclosure, user devices 141-143 may communicate with or may communicate via network 105 in various ways. For example, user device 141 may comprise a cellular telephone which may connect to network 105 via network 170, e.g., a cellular access network. For instance, such an example network 170 may include one or more cell sites, e.g., comprising, a base transceiver station (BTS), a NodeB, an evolved NodeB (eNodeB), or the like (broadly a "base station"), a remote radio head (RRH) and baseband unit, a base station controller (BSC) or radio network controller (RNC), and so forth. In addition, in such an example, components 183 and 184 in network 105 may comprise a serving gateway (SGW), a mobility management entity (MME), or the like. In one example, user device 142 may comprise a customer edge (CE) router which may provide access to network 105 for additional user devices (not shown) which may be connected to the CE router. For instance, in such an example, component 185 may comprise a provider edge (PE) router.

As mentioned above, various components of network 105 may comprise virtual network functions (VNFs) which may physically comprise hardware executing computer-readable/computer-executable instructions, code, and/or programs to perform various functions. As illustrated in FIG. 1, units 123 and 124 may reside on a network function virtualization infrastructure (NFVI) 113, which is configurable to perform a broad variety of network functions and services. For example, NFVI 113 may comprise shared hardware, e.g., one or more host devices comprising line cards, central processing units (CPUs), or processors, memories to hold computer-readable/computer-executable instructions, code, and/or programs, and so forth. For instance, in one example unit 123 may be configured to be a firewall, a media server, a Simple Network Management protocol (SNMP) trap, etc., and unit 124 may be configured to be a PE router, e.g., a virtual provide edge (VPE) router, which may provide connectivity to network 105 for user devices 142 and 143. As noted above, these various virtual network functions may be container-based VNFs and/or VM-based VNFs. In one example, NFVI 113 may represent a single computing device. Accordingly, units 123 and 124 may physically reside on the same host device. In another example, NFVI 113 may represent multiple host devices such that units 123 and 124 may reside on different host devices. In one example, unit 123 and/or unit 124 may have functions that are distributed over a plurality of host devices. For instance, unit 123 and/or unit 124 may be instantiated and arranged (e.g., configured/programmed via computer-readable/computer-executable instructions, code, and/or programs) to provide for load balancing between two processors and several line cards that may reside on separate host devices.

In one example, network 105 may also include an additional NFVI 111. For instance, unit 121 may be hosted on NFVI 111, which may comprise host devices having the same or similar physical components as NFVI 113. In addition, NFVI 111 may reside in a same location or in different locations from NFVI 113. As illustrated in FIG. 1, unit 121 may be configured to perform functions of an internal component of network 105. For instance, due to the connections available to NFVI 111, unit 121 may not function as a PE router, a SGW, a MME, a firewall, etc. Instead, unit 121 may be configured to provide functions of components that do not utilize direct connections to components external to network 105, such as a call control element (CCE), a media server, a domain name service (DNS) server, a packet data network gateway (PGW), a gateway mobile switching center (GMSC), a short message service center (SMSC), etc.

Figure 6:
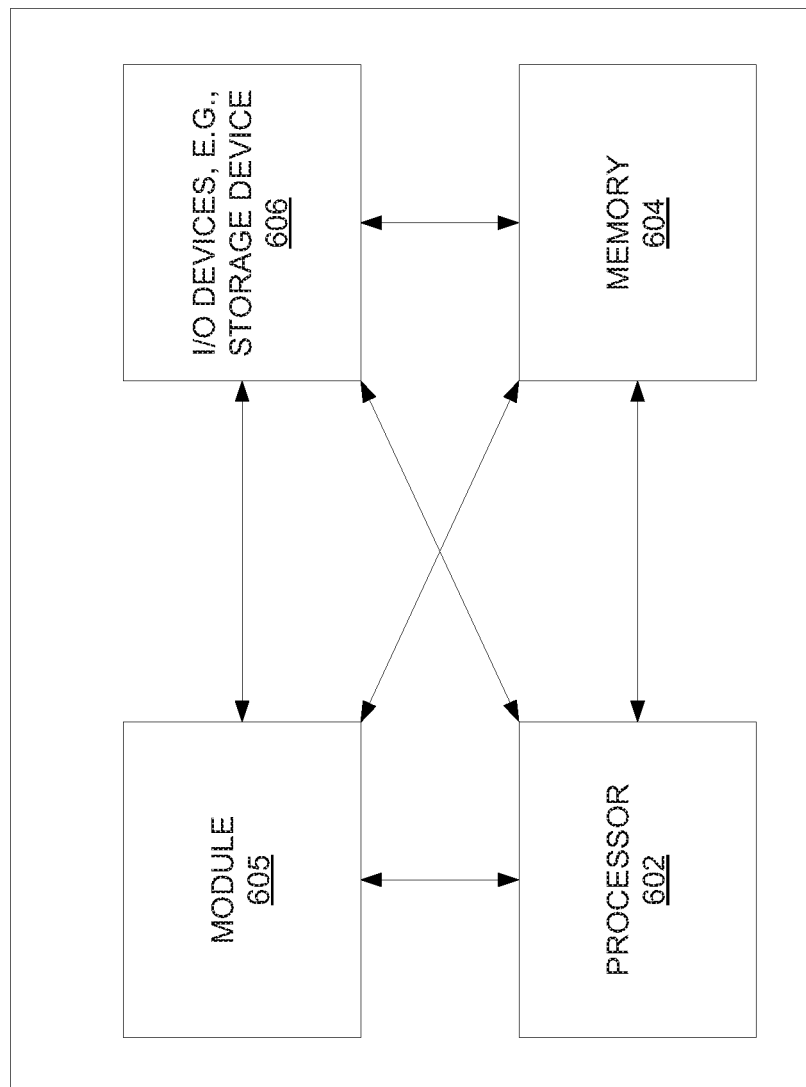
FIG. 6 illustrates a high level block diagram of a computing device specifically programmed to perform the steps, functions, blocks and/or operations described herein.

As further illustrated in FIG. 1, network 105 includes management components 199, which may include probe infrastructure 190 (including several components as described in greater detail below) and a software defined network (SDN) controller 155. In one example, the SDN controller 155 may comprise a computing system or server, such as computing system 600 depicted in FIG. 6, and may be configured to provide one or more operations or functions in connection with examples of the present disclosure for processing trace data of virtual network functions of a telecommunication network via a plurality of stream processing systems. In addition, it should be noted that as used herein, the terms "configure," and "reconfigure" may refer to programming or loading a processing system with computer-readable/computer-executable instructions, code, and/or programs, e.g., in a distributed or non-distributed memory, which when executed by a processor, or processors, of the processing system within a same device or within distributed devices, may cause the processing system to perform various functions. Such terms may also encompass providing variables, data values, tables, objects, or other data structures or the like which may cause a processing system executing computer-readable instructions, code, and/or programs to function differently depending upon the values of the variables or other data structures that are provided. As referred to herein a "processing system" may comprise a computing device including one or more processors, or cores (e.g., a computing system as illustrated in FIG. 6 and discussed below) or multiple computing devices collectively configured to perform various steps, functions, and/or operations in accordance with the present disclosure.

In one example, NFVI 111 and unit 121, and NFVI 113 and units 123 and 124 may be controlled and managed by the SDN controller 155. For instance, in one example, SDN controller 155 is responsible for such functions as provisioning and releasing instantiations of VNFs to perform the functions of routers, switches, and other devices, provisioning routing tables and other operating parameters for the VNFs, and so forth. In one example, SDN controller 155 may maintain communications with VNFs and/or host devices/NFVI via a number of control links 151 which may comprise secure tunnels for signaling communications over an underling IP infrastructure of network 105. In other words, the control links 151 may comprise virtual links multiplexed with transmission traffic and other data traversing network 105 and carried over a shared set of physical links. For ease of illustration control links associated with some of the components of network 105 are omitted from FIG. 1. In one example, the SDN controller 155 may also comprise a virtual machine operating on NFVI/host device(s), or may comprise a dedicated device. For instance, SDN controller 155 may be collocated with one or more VNFs, or may be deployed in a different host device or at a different physical location.

The functions of SDN controller 155 may include the selection of NFVI from among various NFVI available in network 105 (e.g., NFVI 111 or 113) to host various devices, such as routers, gateways, switches, etc., and the instantiation of such devices. For example, with respect to units 123 and 124, SDN controller 155 may download computer-executable/computer-readable instructions, code, and/or programs (broadly "configuration code") for units 123 and 124 respectively, which when executed by a processor of the NFVI 113, may cause the NFVI 113 to perform as a PE router, a gateway, a route reflector, a SGW, a MME, a firewall, a media server, a DNS server, a PGW, a GMSC, a SMSC, a CCE, and so forth. In one example, SDN controller 155 may download the configuration code to the NFVI 113. In another example, SDN controller 155 may instruct the NFVI 113 to load the configuration code previously stored on NFVI 113 and/or to retrieve the configuration code from another device in network 105 that may store the configuration code for one or more VNFs. The functions of SDN controller 155 may also include releasing or decommissioning unit 123 and/or unit 124 when no longer required, the transferring of the functions of units 123 and/or 124 to different NFVI, e.g., when NVFI 113 is taken offline, and so on.

In addition, in one example, SDN controller 155 may represent a processing system comprising a plurality of controllers, e.g., a multi-layer SDN controller, one or more federated layer 0/physical layer SDN controllers, and so forth. For instance, a multi-layer SDN controller may be responsible for instantiating, tearing down, configuring, reconfiguring, and/or managing layer 2 and/or layer 3 VNFs (e.g., a network switch, a layer 3 switch and/or a router, etc.), whereas one or more layer 0 SDN controllers may be responsible for activating and deactivating optical networking components, for configuring and reconfiguring the optical networking components (e.g., to provide circuits/wavelength connections between various nodes or to be placed in idle mode), for receiving management and configuration information from such devices, for instructing optical devices at various nodes to engage in testing operations in accordance with the present disclosure, and so forth. In one example, the layer 0 SDN controller(s) may in turn be controlled by the multi-layer SDN controller. For instance, each layer 0 SDN controller may be assigned to nodes/optical components within a portion of the network 105. In addition, these various components may be co-located or distributed among a plurality of different dedicated computing devices or shared computing devices (e.g., NFVI) as described herein.

As illustrated in FIG. 1, network 105 may also include internal nodes 131-135, which may comprise various components, such as routers, switches, route reflectors, etc., cellular core network, IMS network, and/or VoIP network components, and so forth. In one example, these internal nodes 131-135 may also comprise VNFs hosted by and operating on additional NFVIs. For instance, as illustrated in FIG. 1, internal nodes 131 and 135 may comprise VNFs residing on additional NFVI (not shown) that are controlled by SDN controller 155 via additional control links. However, at least a portion of the internal nodes 131-135 may comprise dedicated devices or components, e.g., non-SDN reconfigurable devices.

Similarly, network 105 may also include components 181 and 182, e.g., PE routers interfacing with networks 160, and component 185, e.g., a PE router which may interface with user device 142. For instance, in one example, network 105 may be configured such that user device 142 (e.g., a CE router) is dual-homed. In other words, user device 142 may access network 105 via either or both of unit 124 and component 185. As mentioned above, components 183 and 184 may comprise a serving gateway (SGW), a mobility management entity (MME), or the like. However, in another example, components 183 and 184 may also comprise PE routers interfacing with network(s) 170, e.g., for non-cellular network-based communications. In one example, components 181-185 may also comprise VNFs hosted by and operating on additional NFVI. However, in another example, at least a portion of the components 181-185 may comprise dedicated devices or components.

As mentioned above, management components 199 may further include probe infrastructure 190. The probe infrastructure 190 may include a probe configuration service 192, which may manage probe functions of VNFs of network 105 (and/or any physical network functions (e.g., physical probe servers that may be similarly configurable)). The probe infrastructure 190 may also include data distribution platform(s) 194 (e.g., a plurality of data distribution platforms, such as instances of Apache Kafka, Apache Pulsar, or the like). For instance, the probe infrastructure 190 may be organized into zones, regions, and/or hierarchical layers/levels, where each zone, region, etc., may include one of the data distribution platform(s) 194. Similarly, each zone, region, etc. may similarly have an assigned one of the stream processing system(s) 196.

In accordance with the present disclosure, VNFs may include probe modules (e.g., within each VNF) which are configurable to collect, generate, create, transmit, and/or otherwise process probe/trace data. For instance, in existing physical probe infrastructure, a probe server may include or may be coupled to a passive splitter which may copy all or a portion of network traffic on a link or interface (e.g., raw packets). The probe server may then forward the raw packets to a collector, or may sample the raw packets and forward to such collector. A centralized service may then analyze the raw packets to generate performance indicators, logs, etc. In contrast, in accordance with the present disclosure, probe functionality is placed in the network functions (e.g., VNFs) themselves, rather than in dedicated probe servers. As such, these VNFs may be configured, e.g., via probe configuration service 192, to collect, generate, create, transmit, and/or otherwise process probe/trace data, which may include packets, performance indicators, events, and/or logs. For instance, a VNF may be configured to mirror all packets, all packets on an interface, a random sampling of packets, etc. and to forward the packets upstream via one of data distribution platform(s) 194. For instance, a VNF may be configured to write trace data to a "topic" of one of the data distribution platform(s) 194.

An associated one of the stream processing system(s) 196 (e.g., one that is assigned to the same zone as the VNF and the one of the data distribution platform(s) 194) may be configured as a "subscriber" to the "topic," and may thus obtain the trace data from the VNF (and similarly from other VNFs in the same zone, from the same or different topics). The one of the stream processing system(s) 196 from the same zone may additionally process the trace data from the VNF (and from other VNFs in the same zone), such as filtering, joining, aggregating, sampling, etc., and may generate KPIs, events, and/or logs, which may be added to the trace data. In one example, the stream processing system(s) 196 in the same zone may also "tag" the trace data for further processing by one or more others of the stream processing system(s) 196 in higher levels/layers of the hierarchical architecture. For instance, the trace data (or at least a portion thereof) may be written/published to the same or one or more other topics to forward via another one of the data distribution platform(s) 194 (e.g., for a region that includes the zone). In turn, another of the stream processing system(s) 196 may be a subscriber to the topic, or topics. In particular, the another one of the stream processing system(s) 196 may be for a region (and thus at a next hierarchical level/layer up from the zone). The probe architecture may include any number of hierarchical layers, but in one example, includes at least two layers (e.g., zones and region(s), where VNFs are assigned to zones, and where each region is assigned one or more zones).

As illustrated in FIG. 1, probe infrastructure 190 may further include data storage and archiving systems 198. In one example, data storage and archiving systems 198 may comprise Structured Query Language (SQL) or no-SQL databases stored in one or more data storage systems comprising a plurality of host devices that may be dedicated to trace data storage, or which may be shared infrastructure that may host a number of different databases. In one example, such database, or databases for trace data may be associated with a regional hierarchical layer or a higher layer (comprising a plurality of regions). In one example, data storage and archiving systems 198 may also comprise an archive system, e.g., comprising a plurality of centralized and/or distributed storage devices for more long-term storage of all or a portion of the trace data from VNFs (and/or PNFs, physical probes, etc.). For instance, databases of the data storage and archiving systems 198 may be for storing trace data for hours or days, while the archive system may be for weeks or months of storage.

The probe infrastructure 190 is illustrated at a high-level in FIG. 1. For instance, details of the hierarchical structure of zones comprising VNFs, data distribution platforms, and stream processing systems, and a region comprising data distribution platforms, stream processing systems, and so forth are omitted from illustration in FIG. 1. FIG. 2 illustrates a more detailed representation of an example hierarchical probe architecture for a telecommunication network, in accordance with the present disclosure. Thus, these and other aspects of probe infrastructure 190 are described in greater detail below in connection with the examples of FIGS. 2-6.

It should be noted that the system 100 has been simplified. In other words, the system 100 may be implemented in a different form than that illustrated in FIG. 1. For example, the system 100 may be expanded to include additional networks, such as a network operations center (NOC) network, and additional network elements (not shown) such as border elements, routers, switches, policy servers, security devices, gateways, a content distribution network (CDN) and the like, without altering the scope of the present disclosure. In addition, system 100 may be altered to omit various elements, substitute elements for devices that perform the same or similar functions and/or combine elements that are illustrated as separate devices. In still another example, SDN controller 155, all or some of the components of probe infrastructure 190, and/or other network elements may comprise functions that are spread across several devices that operate collectively as a SDN controller, a data distribution platform, a stream processing system, a data storage system, etc. Thus, these and other modifications of the system 100 are all contemplated within the scope of the present disclosure.

FIG. 2 illustrates an example hierarchical probe architecture 200 for a telecommunication network, in accordance with the present disclosure. In the present example, there are two layers/levels in the hierarchy, e.g., a zone level, or layer, and a region level, or layer. However, it should be understood that in other examples, additional layers may be present, (e.g., three layers/levels, four layers/levels, etc.). As illustrated in FIG. 2, there are two zones, zone 1 (210), and zone 2 (220). Each of these zones includes a plurality of probe elements. For instance, the probe elements of zone 1 include VNFs 211-213 and a probe 214 (e.g., a probe VNF). Similarly, the probe elements of zone 2 include VNFs 221-223 and a probe 224 (e.g., a probe VNF). Zones 1 and 2 include respective data distribution platforms 216 and 226, and respective stream processing systems 218 and 228. The data distribution platforms 216 and 226 may comprise, for example, a plurality of servers comprising an instance of Apache Kafka, Apache Pulsar, or the like. In one example, the data distribution platforms 216 and 226 may comprise network function virtualization infrastructure (NFVI)/host devices that are configured to host virtual machines (VMs) and/or containers (e.g., VM-based and/or container-based virtual network functions (VNFs)) that are configured to operate collectively as a data distribution platform. In one example, the data distribution platforms 216 and 226 may be dedicated to the hierarchical probe architecture 200. In another example, the data distribution platforms 216 and 226 may be shared for other purposes of the telecommunication network operator. In addition, the stream processing systems 218 and 228 may comprise instances of Apache Spark, Apache Flink, or the like, which may operate on top of, or in conjunction with the respective data distribution platforms 216 and 226. For instance, in one example, the stream processing systems 218 and 228 and the respective data distribution platforms 216 and 226 may fully or partially comprise shared hardware/infrastructure (e.g., at least partially instantiated on the same host devices/NFVI, etc.).

The stream processing systems 218 and 228 of zones 1 and 2 may process trace data from VNFs in the respective zones and may forward the trace data (e.g., at least a portion thereof, including any transformations, alternative or additional trace data generated by stream processing systems 218 and 228, etc.) upstream to region 1 (230) by writing the trace data (e.g., at least the portion thereof) to one or more topics and forwarding the trace data (e.g., at least the portion thereof) via data distribution platform 236. In one example, an additional stream processing system 238 may subscribe to one or more of the topics to obtain the trace data from zones 1 and 2 and to apply additional in-stream processing. In this regard, it should be noted that data distribution platform 236 may be the same as or similar to the data distribution platforms 216 and 226, and likewise stream processing system 238 may be the same as or similar to the stream processing systems 218 and 228. However, in the example of FIG. 2, the region 1 (230) also includes storage element(s) 250 and archive element(s) 260. In addition, it should be noted that in various examples, one or more components of region 1 (230), one or more components of zone 1 (210) and/or zone 2 (220), and so forth may be provided by one or more third-parties (e.g., one or more public cloud infrastructure providers).

In one example, each of the probe elements is expected to publish the "trace data" to the respective data distribution platforms 216 and 226 (e.g., a Kafka/Pulsar data/message bus, Rocket MQ, or the like) with appropriate tags on topics which can be used to sub-divide and load balance event streams. For example, a topic identifier (ID) could be slice ID, DNN, hash/modulo function on a correlation key or subscriber identity, or the like, which may enable selective processing and correlation of trace data from multiple sources for consumption by one or more of applications 299.

In one example, a configuration service component 270 is used to configure a "tracing policy" to the specified group(s) of VNF instances across the entire network (or at least within a region, such as region 1 (230) illustrated in FIG. 2). For instance, as illustrated in FIG. 2, control links 295 may be established to enable communications between configuration service component 270 and various other entities on the architecture 200. For illustrative purposes, trace data flows 291 are also shown in FIG. 2. In one example, the VNFs may register schemas, which may be stored (e.g., in storage system 250, such as a No-SQL DB) with versioning and timestamp information. At this stage, the topics (e.g., Kafka/Pulsar topics) on which events will be published may also be negotiated with the VNF. In one example, a network operator may provide different topics for different slices of data coming from the same VNF type. For receiving the packets, either a high-performance message bus and/or a secure point-to-point protocol, such as IPSec or Transport Layer Security (TLS), may be used. Once the "tracing policy" is enabled, the configuration service component 270 may activate the "tracers" in all the VNF instances, which may start generating the "trace data" (raw packets, and/or events, logs, etc.) in configurable, pre-defined formats. As noted above, in one example, all events, logs, or the like may be in CVES-HV format. In addition, trace data packets may be in PCAP-NG format (with modification as defined herein).

The CVES-HV format builds upon the VES-HV format and defines a set of new fields to support easy querying and filtering of trace data for troubleshooting. In one example, two flexible fields (hashmap) and (protobuf) are used to pack trace data. Protobuf is primarily used for efficiency reasons and other benefits it provides. In one example, hashmap may be used for one or several fields that may be added between major releases/updates of the CVES-HV format. In one example, the CVES-HV format may also include an optional "packet" field for including raw packet trace data (e.g., comprising copied/mirrored packets). As noted above, in accordance with the present disclosure, such packets may be in the PCAP-NG format (with modification as defined herein). In particular, PCAP-NG provides well defined headers/sections for adding metadata.

In accordance with the present disclosure, the CVES-HV format may include the following metadata fields: timestamp (microsecond resolution)—it is expected that different VNFs may perform a time-synchronization; interface ID or name (e.g., 3GPP interface); capture filter—e.g., the policy under which the packet was collected/copied; identifier—e.g., SUPI, IMSI, or the like; MSISDN; correlation ID, event sequence number—this will correspond to the sequence number of the CVES-HV event and will allow the probe system to look up the event. In one example, Interface Description Block (IDB) of the PCAP-NG format may carry the interface type (e.g., Linktype for the 3GPP interface, interface name, address, and capture filter, (e.g., sampled, whitelist IMSI, flexible filter, etc.)). In one example, the Enhanced Packet Block (EPB) of the PCAP-NG format may carry the timestamp. Other metadata fields mentioned above may be carried in the "comment string" of the VES-HV format, e.g., IMSI, MSISDN, correlation ID, event sequence number, etc.

It should be noted that the VES-HV header may already include fields for information such as event name, domain, eventId event type, nfcNamingCode, sourceId, sourceName, reportingEntityId, reportingEntityName, sequence number, and so forth. It should also be noted that the foregoing description of trace data CVES-HV and/or modified PCAP-NG formatting is just one example of how trace data (e.g., packets and/or events, logs, performance indicators, or the like) may be formatted and packaged for conveyance via the architecture 200 for processing probe/trace data. Thus, other, further, and different formats may be used that provide the same or substantially similar functionality in accordance with the present disclosure.

In one example, the details of the trace data can be dynamically adjusted by calling an API 280. For example, one of the applications 299 may include an operator interface via which a user may select a debug level HIGH (e.g., corresponding to critical events), and a debug level of LOW (e.g., corresponding to all packets or all events on the VNFs). In such an example, the configuration service component 270 may adapt the "tracing policy" or may apply a new tracing policy via instructions to the respective VNFs. In another example, the VNFs may be configured to apply sampling (fixed, adaptive) techniques to reduce the volume of trace data events, while maintaining monitoring capability to detect issues, and so forth.

In one example, new VNFs may be on-boarded into the tracing architecture 200 as follows. First, a VNF may register its data definition file (e.g., ".proto", or the like) via configuration service component 270. Configuration service component 270 may then provide the VNF with one or more topics and/or destinations to publish or send trace data. In one example, the tracing policy may be adapted to define the topics and/or destinations according to a load balancing policy, prioritization policy, etc. The .proto definition is stored in a database (in addition, history and version may be maintained). The tracing policy is activated on the VNF. The VNF starts streaming messages on the topic(s) to the local data distribution platform (e.g., one of data distribution platforms 216 or 226).

In parallel, a probe data processing engine (e.g., one of stream processing systems 218 or 228) is configured to process particular topics by reading the configuration database (e.g., with the .proto definition file(s)). For a closed-loop system, VNFs can be configured via central API 280 and configuration service component 270, which may configure all VNF instances which are designated according to a defined policy. It should be noted that insofar as stream processing systems 218 and 228 may correlate, aggregate, and define additional trace data (such as aggregate KPIs), the stream processing systems 218 and 228 may subscribe to multiple topics from different VNFs within the respective zones. Alternatively, or in addition, multiple VNFs within a respective zone may publish trace data to a same topic, which may be subscribed to by a respective one of the stream processing systems 218 and 228 for correlation, aggregation, sampling, and so forth. For instance, topics may be used as tags/correlation keys to tie the trace data together at the stream processing systems 218 and 228 (as well as at stream processing system 238 and/or on the applications 299). Correlation may be implemented in an on-demand approach, or an active approach based on network operator policies/needs.

In addition to configuring VNFs for probe functions, the configuration service component 270 may also configure the stream processing systems 218, 228, 238 (and in one example, the data distribution platforms 216, 226, and 236), e.g., in accordance with instructions/commands from application 299 via API 280. The stream processing systems 218, 228, and 238 provide capabilities for stream processing (e.g., in-memory data processing) as well as historical trace data processing. In one example, each of the stream processing systems 218, 228, and 238 may comprise in-memory tables that are built based on event fields, configuration files, etc., and which may be used for look-up, KPI computation, enrichment, updates, etc. Functions of stream processing systems 218, 228, 238 include priority based processing of events and packets. For instance, the architecture 200 may provide numeric priority levels per event type to process the events. For example, this may allow processing high-priority events with minimal delay and handling of over-load conditions with minimal business impact. The architecture 200 may also provide different classes of data processing per event. For instance, the stream processing systems 218, 228, and 238 may process each event differently based on logic rules defined by the network operator. For example, minimally, each event may be indexed by certain fields (such as IMSI and timestamp) and stored. However, for certain events, many indexes may be generated, the protobuf section may be decoded, new fields can be added, computations can be made based on fields in events/packets, etc., and/or various other transformations of the trace data may be applied.

The stream processing systems 218, 228, and 238 may engage in real-time (or near-real-time) filtering and export of events and packets. In particular, the stream processing systems 218 and 228 may write trace data to specified/predetermined topics and forward such trace data upstream via data distribution platform 236 of region 1 (230). Trace data (including packets, events, transformations, metadata, etc.) may be further processed by stream processing system 238, and may be stored to storage element(s) 250, as well as object storage/archive element(s) 260. In one example, the archive element(s) 260 may comprise a storage backend such as Apache Cassandra, ArangoDB, Berkeley DB, or the like. In addition, in one example, the archive element(s) 260 may be provided by a third-party (e.g., a public cloud data storage system). In one example, storage element(s) 250 may include SQL and No-SQL databases for storage and fast-retrieval of relevant information. In one example, storage element(s) 250 and archive element(s) 260 manage storage retention as per configured policies (e.g., number of hours/days of retention per type of trace data, per VNF type, etc.); old data beyond retention period(s) may be purged.

Stream processing systems 218, 228, and/or 238 may also provide historical search of events and packets via indexed fields (e.g., IMSI and timestamp). For instance, correlation rules enable events and/or packets to be linked together and retrieved on-demand. In addition, stream processing systems 218, 228, and/or 238 may provide on-demand counter/KPI computation and reporting based on event/packet fields, real-time or near-real-time anomaly detection (e.g., using machine-learning models), alarms on various high-load conditions (for VNF and/or host processor, memory, storage, etc.), and so forth. In one example, the stream processing systems 218, 228, and/or 238 expose a well-defined SQL-like interface to query and process events and packets in-stream and historically. In one example, the architecture 200 establishes a support hierarchy. For instance, in cases of over-load or for capacity management, parts of a workload for one stream processing system may be offloaded to another stream processing system, e.g., in a different zone or in another layer (e.g., at the region level/layer). Thus, the multi-tier architecture 200 can be deployed to handle large volumes of events and packets.

Applications 299 may include automated services, as well as one or more user applications, e.g., for visualizing trace data, managing the collection and processing of trace data via the architecture 200, querying the trace data, and so forth. In accordance with the present disclosure, architecture 200 may thus service various troubleshooting applications. For instance, one such application may include an end-to-end subscriber troubleshooting tool. To illustrate, a given subscriber may be identified by IMSI, IMEI, MSIS, or the like. The troubleshooting application may enable an operator to enter a request for all of the packets (e.g., trace data) associated with the subscriber's connection setup, service requests, handover, etc., with appropriate timestamps. In case the raw packets are not available, the architecture 200 may still provide events and/or logs (e.g., trace data), which can be used to troubleshoot service issues. In one example, the trace data may be displayed in a "call ladder diagram" format to assist with troubleshooting. For instance, the trace data may include mobility control plane trace data, mobility user plane data, IMS control plane data, etc. In one example, the application may direct the request to architecture 200 via API 280 as a query/command such as: "RETRIEVE all messages/events for time in [t1,t2] where F1=x and F2=y . . . ", where t2 can be current time/ongoing/future time, t1 can be 30 days prior or older, etc. In one example, auxiliary queries may be generated based on results. It should be noted that the stream processing systems 218, 228, and 238 enable stream processing (including partial processing of queries, or processing of sub-queries). In this regard, the application and/or another component of the architecture 200, such as configuration service component 270, may configure stream processing systems 218, 228, and 238 to gather, transform, enhance, or otherwise process trace data relating to the queried subscriber as such trace data moves upstream, e.g., via trace data flows 291.

It should also be noted that the architecture 200 may provide a closed-loop system in which policies, or "triggers" (e.g., predefined, adaptive, and/or machine learning (ML)-based policies/triggers) may cause one or more automated changes to the architecture 200. The automated changes may including altering one or more data flows or creating one or more new data flows, such as configuring new and/or different subscribers to one or more topics, configuring a ramp-up in data collection, data processing, and/or data enhancement (e.g., collecting data from new and/or additional VNFs, increasing a frequency of data collection and/or data forwarding, maintaining a finer granularity of the data that is collected and/or the data that is forwarded upstream, etc.), and so on. For instance, the policies may be implemented at various components of the architecture 200, such as at applications 299, as well as at stream processing systems 218, 228, and/or 238, VNFs 211-213, VNFs, 221-223, and so forth. When data from one or more topics, or streams, matches a policy, the policy may cause the respective component to invoke configuration service 270, which may configure or reconfigure one or more other components of the architecture 200 in accordance with the policy.

In another example, an application may include a packet inspection tool to provide an operator or automated system the ability to look at events/packets on an interface (e.g., each packet or event, or a sampling thereof), to inspect, decode, and/or filter based on any one or more fields (e.g., in real-time or near-real-time) as well as for a historical timeframe, and so forth. For historical queries relating to large numbers of packets, gathering the trace data and visualizing results may take several minutes. However, in one example, partial results may be streamed and displayed as the trace data becomes available. In one example, the application may direct the request to architecture 200 via API 280 as a query/command such as: "RETRIEVE all packets for t in [t1,t2] & IE_1=a & IE_2=b . . . ", where t2 can be current time/ongoing (and in one example, t1 can be 30 days prior or older). In such an example, filters can be added based upon an initial result, or may be applied in connection with the original query/request to reduce the volume of results. In one example, additional metadata (which may be considered as additional trace data) may be generated, such as COUNT, SUM, AVG, etc.

In one example, applications 299 may also provide tools to analyze metrics. For instance, performance indicators may be included in trace data (e.g., as configured via the architecture 200, not necessarily in connection with any particular troubleshooting request). Such performance indicators may include latency metrics, cause code metrics, metrics by device type, access point name (APN), quality-of-service (QoS) class indicator (QCI), and so forth. In this regard, one or more of applications 299 may enable an operator to retrieve metrics for specific calls, generate batch mode reports, and so forth. In addition, ad-hoc performance indicator generation and collection may also be provided, e.g., via a request from one of applications 299, which may result in configuration of one or more VNFs, stream processing systems, etc. via API 280 and configuration service component 270. In one example, machine learning and/or artificial intelligence-based processing may also be implemented (by one of applications 299 and/or within stream processing system(s) 218, 228, and/or 238, e.g., with different aspects of a ML pipeline being implemented by different components). For instance, one or more of stream processing system(s) 218, 228, and/or 238 may simply be engaged in preprocessing of trace data that may comprise inputs to a machine learning model implemented at one of applications 299. However, in another example, one or more of stream processing system(s) 218, 228, and/or 238 may include a machine learning model that processes trace data and generates alerts alarms, provides VNF health scores, and so forth in-stream. In other words, the output(s) of such a machine learning model may be added to trace data that is moving upstream via trace data flows 291.

As another example, one or more of applications 299 may provide exporting of events to one or more third-party systems via a secure interface. In one example, applications 299 may include third-party applications that are authorized to use the architecture 200, e.g., including stream processing system(s) 218, 228, and/or 238, storage element(s) 250, archive element(s) 260, etc. In another example, one or more of applications 299 may provide access to architecture 200 for one or more third party applications.

In one example, the architecture 200 provides a WebAPI (e.g., API 280) for registration which may take a ".proto" specification for the "hvMeasPayload" in the CVES-HV format and return topic IDs, Kafka service and/or packet destinations. In addition, in one example, VNFs provide options to configure topic IDs, Kafka service and/or packet destinations, etc., via one or more corresponding API calls. In particular, in accordance with the present disclosure a VNF may support several WebAPI calls in a secure manner, each of which may have an option to be applied globally (as a flag) or a particular cluster/location (e.g., with a fully qualified domain name (FQDN)) on-demand. Several WebAPI calls of the present disclosure may include: (1) IMSI Whitelist Create—create a new whitelist with 0 or more entries; (2) IMSI Whitelist Add/Append—add a list of discrete IMSIs (passed as a .csv) to the existing whitelist—multi-part uploads may support up to 100,000 IMSIs per API call; (3) IMSI Wildcard Support—this may be used to create a sample of IMSIs. For example, whitelist all IMSI that end with digit "5" by adding the entry "**************5" to the whitelist; (4) IMSI Whitelist Delete—delete a list of IMSIs from the current whitelist. In one example, this call may support multi-part uploads, e.g., up to 100,000 IMSIs per API call; and (5) IMSI Whitelist Export—export the currently active list of IMSIs in the whitelist. The expectation is that for all subscriber identifiers (e.g., IMSI, etc.) in a whitelist, packets and events (if enabled) on each relevant mobile interface may be streamed to the appropriate probe packet sink/message bus. In one example, the same APIs are extended to supporting lists of MSISDN and SUPI.

Additional WebAPI calls of the present disclosure may include:

(6) Packet trace based on interface—turn on and off particular interfaces (by name or network operator-defined code) from monitoring profile.

(7) Configure packet sampling ratio per interface (slice and DNN)—configure the sampling ratio for packets on an interface on a per slice ID and or DNN level. The network operator can use this call to set a global sampling rate (e.g., 20%) and then choose to monitor selected slice IDs or DNNs at a higher rate (e.g., 50%). Note that all the transaction/packets belonging to the same session (subscriber) may be streamed to the probe packet sink. One approach of sampling that may be provided is to sample based on whitelisting last digit(s) in the IMSI/MSISDN/SUPI field as described above. Thus a 10% sampling rule can be created by selecting all IMSIs that end with digit 5.

(8) Adaptive sampling per interface—this sets a threshold on the PPS (packet per second) rate for a given VNF for each interface before sampling profile is triggered. The thresholds can be set separately for each interface. A HV-VES event should be published when this is triggered and when it is removed.

(9) Configure event sampling ratio per interface (slice and DNN)—configures the session sampling ratio on events on an interface per slice and/or DNN level. This call can be used to set a global sampling rate (e.g., 20%) and then choose to monitor selected slice IDs or DNNs at a higher rate (e.g., 50%). Note that all the transaction/events belonging to the same session (subscriber) may be streamed to the probe message bus with appropriate topic IDs and CVES-HV format.

(10) Adaptive sampling per interface (slice and DNN)—this sets a threshold on the EPS (events per second) rate for a given VNF for each interface before sampling profile is triggered. The thresholds can be set separately for each interface.

(11) Flexible filter—this call may turn ON and OFF a filter on a VNF, which passes the events (with embedded packets) corresponding to transactions that match the filter to the probe packet sink or message bus. For example, if a filter was defined on transactions that time out, the packet with the request may be embedded in the event. If the filter was defined on a failed transaction, both the packet(s) with the request and the packet(s) with the response may be embedded in the event. Dedicated topic(s) may be defined to collect flexible filter triggered events.

(12) Add filter pattern—the network operator may define different conditions (as a set of cause codes, latency of transaction, number of retries, threshold, etc.) to classify filters that will serve as trigger(s) for capture. Any filter can be changed on-the-fly without service-impacting component restart. This call returns a filter code. Multiple filters can be active simultaneously.

(13) Export filter patterns—this call returns the list of filter patterns and corresponding codes that are currently active.

(14) Remove filter pattern—the filter code can be used to remove a previously configured filter.

(15) Configure Debug level (low, med, high)—this call configures the extent of information provided in the trace data (e.g., events) based on the troubleshooting scenario. The "high" granularity may have details about the message protocol, the message contents and the message components/sub-components (e.g., as defined by 3GPP).

These various WebAPI calls may be invoked to configure overall trace data collection and processing flows or may be used on an ad-hoc basis to generate, collect, enhance, forward, or otherwise process additional trace data on-demand.

In one example, VNFs may generate periodic statistics (e.g., 5 minutes, 10 minutes, etc.) regarding the health status of probe functions (e.g., in contrast to the general functions of such VNFs performing as routers, switches, gateways, firewalls, filters, mobility management entities (MMEs), etc.). For instance, VNFs may generate and report a total number of successful API calls, a total number of failed API calls, a number of events generated per interface, a number of events dropped/unable to send per interface, a bandwidth consumed (e.g., in Mbps) by event streams per interface, a number of mirrored packets sent per interface, a number of mirrored packets dropped/unable to send per interface, a bandwidth consumed (e.g., in Mbps) by packet streams per interface, a number of whitelist entries configured (at that instance), a number of subscribers active from the whitelist (at that instant), a number of events triggered by flexible filters, and so forth. In one example, VNF creators (e.g., the network operator and/or one or more third parties) may add additional reporting data regarding the health, sizing, correctness of the probing feeds, and so forth.

It should again be noted that the architecture 200 of FIG. 2 provides an illustrative example of a hierarchical probe architecture for a telecommunication network, in accordance with the present disclosure. Thus, it should be understood that the architecture 200 may be expanded to include additional zones, may include additional hierarchical layers/levels, may include additional components, such as local storage for stream processing systems 218 and 228 at the zone level, and so forth. In addition, functions that are illustrated as one component of the architecture 200 may be distributed across multiple components, other functions may be combined into a single component, and so forth. For instance, configuration service component 270 may comprise separate components or modules for configuring VNFs, stream processing system, and data distribution platforms, respectively. Thus, these and other modifications are all contemplated within the scope of the present disclosure.

Figure 3:
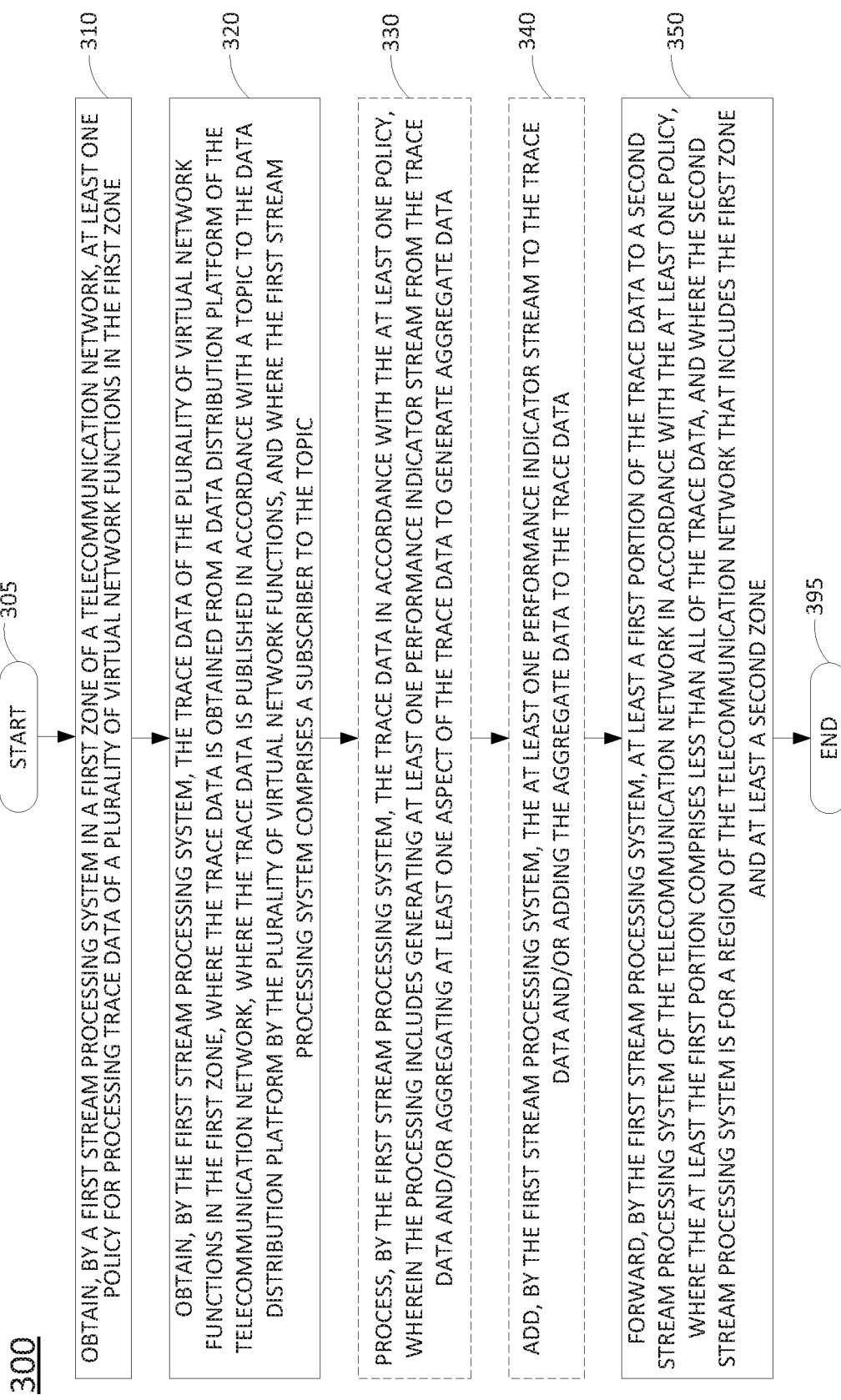
FIG. 3 illustrates a flowchart of a first example method for processing trace data of virtual network functions of a telecommunication network via a plurality of stream processing systems.

FIG. 3 illustrates a flowchart of a first example method 300 for processing trace data of virtual network functions of a telecommunication network via a plurality of stream processing systems, in accordance with the present disclosure. In one example, the method 300 is performed by one or more components of a probe infrastructure of a telecommunication network (e.g., one or more components of probe infrastructure 190 of FIG. 1, such as one of stream processing system(s) 196, or one or more components of architecture 200, such as one of stream processing systems 216, 226, or the like), or by one or more components thereof, (e.g., a processor, or processors, performing operations stored in and loaded from a memory), or by a stream processing system in conjunction with one or more other components, such as one or more data distribution platforms, one or more other stream processing systems, VNFs, archive element(s) and/or storage element(s), and so forth. In one example, the steps, functions, or operations of method 300 may be performed by a computing device or system 600, and/or processor 602 as described in connection with FIG. 6 below. For instance, the computing device or system 600 may represent any one or more components of the system 100 and/or architecture 200 that is/are configured to perform the steps, functions and/or operations of the method 300. Similarly, in one example, the steps, functions, or operations of method 300 may be performed by a processing system comprising one or more computing devices collectively configured to perform various steps, functions, and/or operations of the method 300. For instance, multiple instances of the computing device or processing system 600 may collectively function as a processing system. For illustrative purposes, the method 300 is described in greater detail below in connection with an example performed by a processing system. The method 300 begins in step 305 and proceeds to step 310.

At step 310, the processing system, e.g., a first stream processing system in a first zone of a telecommunication network, obtains at least one policy for processing trace data of a plurality of virtual network functions (VNFs) in the first zone. In one example, the at least one policy is obtained from a probe configuration service element of the telecommunication network (such as configuration service component 270 of FIG. 2). The at least one policy may comprise, for example, a selection policy to forward trace data associated with a specific user equipment identifier or a plurality of user equipment identifiers (e.g., a "whitelist"). In one example, the at least one policy may comprise a sampling policy (e.g., sample every $10,000^{th}$ packet, sample packets for IMSIs ending in "5", generate KPIs for IMSIs ending in "2", etc.). Alternatively, or in addition, the at least one policy may comprise a tagging policy, e.g., rules for appending a tag, or tags, to trace data of one or more VNFs in the first zone. In one example, the tags may comprise or may be associated with "topics" for data distribution as described herein. In one example, the configuration service element may receive instructions from one or more client applications as to which policy or policies to deploy, may be provided with new policies to activate and or to store for later activation on-demand, etc.

At step 320, the first stream processing system obtains the trace data of the plurality of VNFs in the first region, where the trace data is obtained from a data distribution platform of the telecommunication network, where the trace data is published in accordance with a topic to the data distribution platform by the plurality of VNFs, and where the first stream processing system comprises a subscriber to the topic. In one example, the trace data may include at least one of: events, logs, packet copies, or performance indicators. In one example, the packet copies may comprise probe packets, e.g., "active probing" via packets that may be injected into the communication network for dedicated probing purposes. In other words, such packets are not control or user plane packets for subscriber communications, and are not network management packets for other components operations. Such packets may be for measuring latency, packet loss, throughput, and so forth. In one example, the probe packets may be injected by probe elements (e.g., dedicated probe VNFs, or the like) that are configured to inject the probe packets. In one example, at least a first VNF of the plurality of VNFs provides packet mirroring function.

At optional step 330, the first stream processing system may process the trace data in accordance with the at least one policy. For instance, in one example, the processing may include generating at least one performance indicator stream from the trace data. In one example, the processing may alternatively or additionally include aggregating at least one aspect of the trace data to generate aggregate data.

At optional step 340, the first stream processing system may add the at least one performance indicator stream and/or the aggregate data to the trace data.

At step 350, the first stream processing system forwards at least a first portion of the trace data to a second stream processing system of the telecommunication network in accordance with the at least one policy, where the at least the first portion comprises less than all of the trace data, and where the second stream processing system is for a region of the telecommunication network that includes the first zone and at least a second zone. In one example, the at least the first portion of the trace data that is forwarded to the second stream processing system may include the at least one performance indicator stream that may be added to the trace data at optional step 340. Similarly, in one example, the at least the first portion of the trace data that is forwarded to the second stream processing system may include the aggregate data that may be added to the trace data at optional step 340.

In one example, the at least the first portion of the trace data may be associated with a specific user equipment identifier or a plurality of user equipment identifiers, e.g., as defined by the at least one policy that is obtained at step 310. Alternatively, or in addition, in an example where the at least one policy comprises a sampling policy, the at least the first portion of the trace data may be selected in accordance with the sampling policy. Similarly, in an example where the at least one policy comprises a tagging policy, the at least the first portion of the trace data may be tagged with at least one tag in accordance with the tagging policy. In addition, in such an example, the second steam processing system may processes the at least the first portion of the trace data in accordance with the at least one tag. For instance, the second stream processing system may be configured according to at least a second policy for the second stream processing system to process the trace data (e.g., in a manner specific to the particular tag, or tags).

In one example, the first stream processing system and the second stream processing system are components of a network probe infrastructure of the telecommunication network, where the network probe infrastructure comprises a hierarchy that includes at least one data storage system (e.g., data storage element(s) 250 in FIG. 2, or the like). In addition, in one example, the at least the first portion of the trace data may be stored in the at least one data storage system (e.g., by the second stream processing system).

In one example, the network probe infrastructure provides access to the at least the first portion of the trace data to at least one client application. For instance, the at least the first portion of the trace data may be accessible to the at least one client application via a structured streaming query. As described above, applications may query and access historical and or streaming trace data. As such, a structured streaming query may be partially fulfilled by data retrievals from a data storage element, a data archiving element, or the like. However, the structured streaming query may be processed, at least in part, by the first stream processing system (and in one example, alternatively or in addition, by the second stream processing system). For instance, the first stream processing system may provide partial results on queried/requested trace data as it is obtained from the first data distribution platform. In one example, the client application, the configuration service element, or another component may parse queries to generate sub-queries that may be distributed to one or several stream processing systems (and/or to archive element(s), storage element(s), and so forth), as described herein. The at least one client application may comprise, for instance, a user interface/dashboard for KPI visualization, alarms/alerting, etc. The at least one client application may include an automated system (or "service"), such as machine learning model (MLM) that is configured to consume trace data and to output alerts, alarms, predictions, and so forth.

The configuration of the plurality of VNFs, the first stream processing system, and/or the second stream processing system, and other components may be explicit or may be determined from the requirements of a query/request (e.g., if the request assumes certain trace data and that trace data is not currently being stored and/or streamed, then the configuration service element may configure the VNFs and/or the stream processing system(s) to gather, calculate, forward, and/or to store such trace data).

Following step 350, the method 300 proceeds to step 395 where the method 300 ends.

Figure 4:
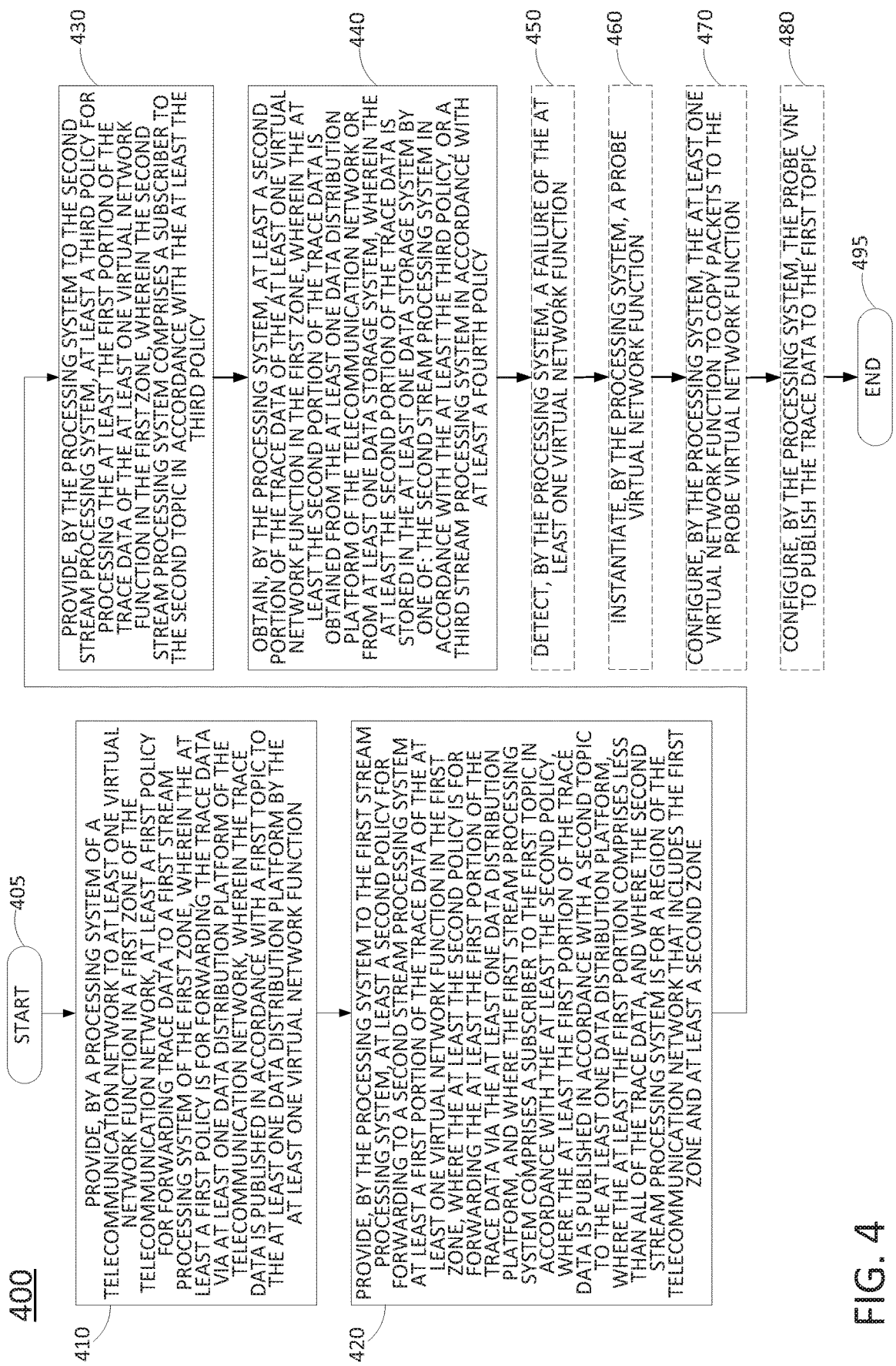
FIG. 4 illustrates a flowchart of a second example method for processing trace data of virtual network functions of a telecommunication network via a plurality of stream processing systems.

FIG. 4 illustrates a flowchart of a second example method 400 for processing trace data of virtual network functions of a telecommunication network via a plurality of stream processing systems, in accordance with the present disclosure. In one example, the method 400 is performed by one or more components of a probe infrastructure of a telecommunication network (e.g., one or more components of probe infrastructure 190 of FIG. 1, such as probe configuration service 192, or one or more components of architecture 200, such as one of configuration service element 270, one of applications 299, or the like), or by one or more components thereof, (e.g., a processor, or processors, performing operations stored in and loaded from a memory), or by one or more of such components in conjunction with one or more other components, such as one or more data distribution platforms, one or more other stream processing systems, VNFs, archive element(s) and/or storage element(s), and so forth. In one example, the steps, functions, or operations of method 400 may be performed by a computing device or system 600, and/or processor 602 as described in connection with FIG. 6 below. For instance, the computing device or system 600 may represent any one or more components of the system 100 and/or architecture 200 that is/are configured to perform the steps, functions and/or operations of the method 400. Similarly, in one example, the steps, functions, or operations of method 400 may be performed by a processing system comprising one or more computing devices collectively configured to perform various steps, functions, and/or operations of the method 400. For instance, multiple instances of the computing device or processing system 600 may collectively function as a processing system. For illustrative purposes, the method 400 is described in greater detail below in connection with an example performed by a processing system. The method 400 begins in step 405 and proceeds to step 410.

At step 410, the processing system provides, to at least one VNF in a first zone of the telecommunication network, at least a first policy for forwarding trace data to a first stream processing system of the first zone, where the at least a first policy is for forwarding the trace data via at least one data distribution platform of the telecommunication network, where the trace data is published in accordance with a first topic to the at least one data distribution platform by the at least one VNF.

At step 420, the processing system provides, to the first stream processing system, at least a second policy for forwarding to a second stream processing system at least a first portion of the trace data of the at least one VNF in the first zone, where the at least the second policy is for forwarding the at least the first portion of the trace data via the at least one data distribution platform. For instance, the at least one data distribution platform may comprise a first data distribution platform and a second data distribution platform (e.g., the first data distribution platform for the first zone and the second data distribution platform for a region that includes the first zone). In one example, the first stream processing system may comprise a subscriber to the first topic in accordance with the at least the second policy. In addition, the at least the first portion of the trace data may be published in accordance with a second topic to the at least one data distribution platform, where the at least the first portion comprises less than all of the trace data, and where the second stream processing system is for a region of the telecommunication network that includes the first zone and at least a second zone.

At step 430, the processing system provides to the second stream processing system, at least a third policy for processing the at least the first portion of the trace data of the at least one VNF in the first zone, where the second stream processing system comprises a subscriber to the second topic in accordance with the at least the third policy.

At step 440, the processing system obtains at least a second portion of the trace data of the at least one VNF in the first zone, where the at least the second portion of the trace data is obtained from the at least one data distribution platform of the telecommunication network or from at least one data storage system. In one example, the at least the second portion of the trace data may be stored in the at least one data storage system by one of: the second stream processing system in accordance with the at least the third policy, or a third stream processing system in accordance with at least a fourth policy.

In one example, the at least the second portion of the trace data may be obtained (either in whole or in part) via a structured stream query, from a storage element, and/or from an archive element. In another example, the at least the second portion of the trace data may be obtained (either in whole or in part) via automated forwarding of the at least the second portion of the trace data or via the processing system configuring itself as a subscriber to, for example, a third topic to which the second portion of the trace data is published by the second processing system (or by a third processing system that may be upstream in an additional layer of the hierarchy).

At optional step 450, the processing system may detect a failure of the at least one VNF. The failure can be, for instance, a partial failure where the at least one VNF indicates an overload condition (e.g., operating at 90 percent capacity, 95 percent capacity, etc.) or other failure in which the at least one VNF remains at least partially operational and in communication with the processing system.

At optional step 460, the processing system may instantiate a probe VNF, e.g., a VNF that is dedicated to obtaining, forwarding, and/or otherwise processing probe data from VNFs or other network functions (e.g., PNFs that do not include probe functionality). In one example, the processing system may instruct one or more host devices/NFVI to obtain an image of the probe VNF and spin-up the probe VNF accordingly. In another example, the processing system may instruct an SDN controller to instantiate the probe VNF via one or more host devices/NFVI. It should be noted that in another example, each zone of the telecommunication network may include at least one probe VNF (or a physical probe device) that is on standby for instances of failover or probe functions of VNFs within the respective zone.

At optional step 470, the processing system may configure the at least one VNF to copy packets to the probe VNF. For instance, the at least one VNF may retain at least sufficient functionality to receive instructions from the processing system and to copy raw packets (or a sampling thereof) to the probe VNF.

At optional step 480, the processing system may configure the probe VNF to publish the trace data to the first topic. In other words, the probe VNF may take-over the probe functionality that was previously provided directly by a component of the at least one VNF itself. The at least one VNF copies or mirrors packets to the probe VNF. In one example, optional step 480 may include configuring the probe VNF to calculate KPIs, generate logs, etc., as an alternative or in addition to writing the packets to the first topic. In one example, optional step 480 may include configuring the probe VNF to tag packets in a particular way (e.g., to include KPIs as a tag, to put label on packet(s) that will affect upstream processing by the first stream processing system and/or the second stream processing system, etc.).

Following step 440 or any one or more of optional steps 450-480, the method 400 proceeds to step 495 where the method 400 ends.

Figure 5:
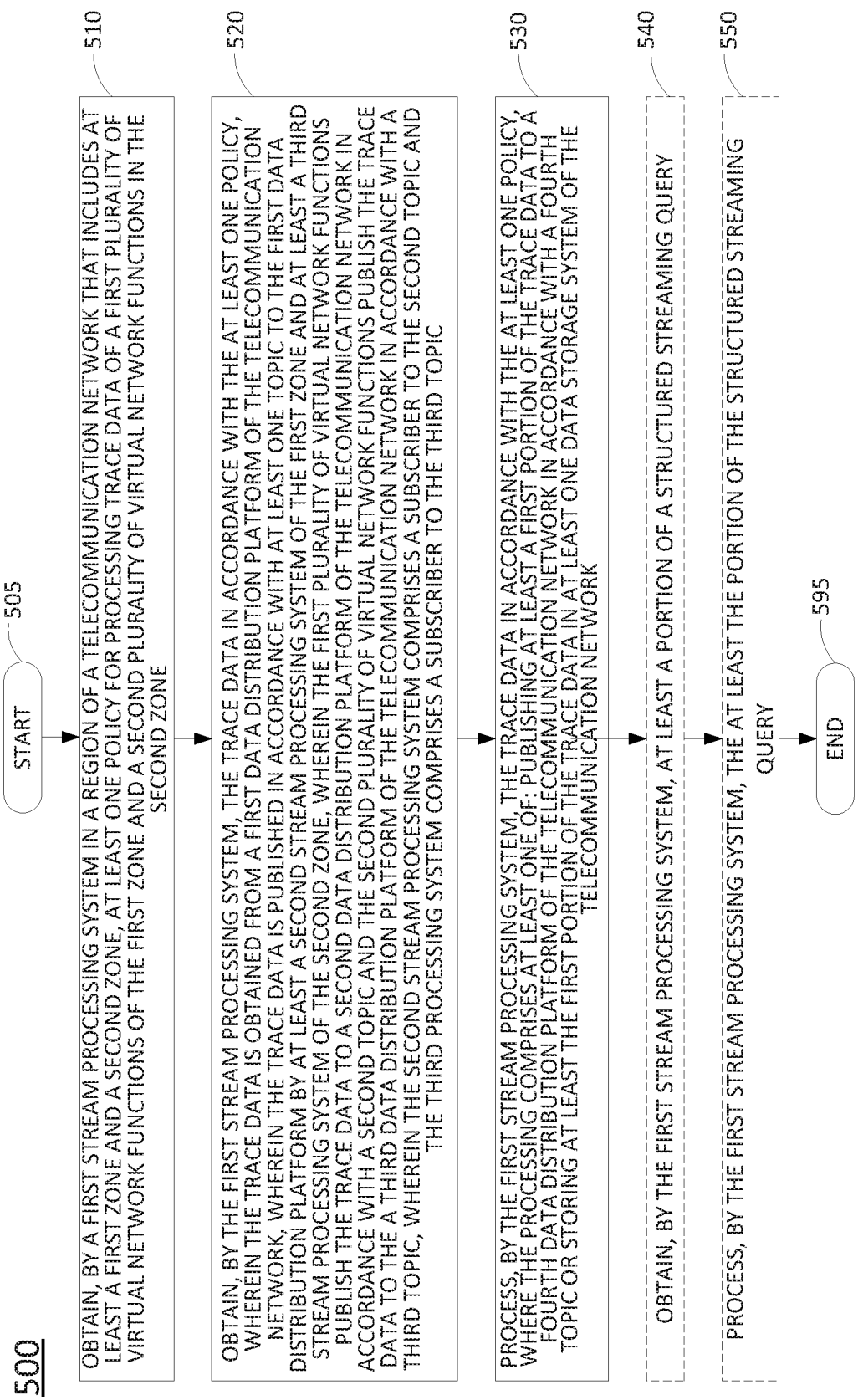
FIG. 5 illustrates a flowchart of a third example method for processing trace data of virtual network functions of a telecommunication network via a plurality of stream processing systems.

FIG. 5 illustrates a flowchart of a third example method 500 for processing trace data of virtual network functions of a telecommunication network via a plurality of stream processing systems, in accordance with the present disclosure. In one example, the method 500 is performed by one or more components of a probe infrastructure of a telecommunication network (e.g., one or more components of probe infrastructure 190 of FIG. 1, such as one of the stream processing system(s) 196, or one or more components of architecture 200, such as stream processing system 236), or by one or more components thereof, (e.g., a processor, or processors, performing operations stored in and loaded from a memory), or by a stream processing system in conjunction with one or more other components, such as one or more data distribution platforms, one or more other stream processing systems, VNFs, archive element(s) and/or storage element(s), and so forth. In one example, the steps, functions, or operations of method 500 may be performed by a computing device or system 600, and/or processor 602 as described in connection with FIG. 6 below. For instance, the computing device or system 600 may represent any one or more components of the system 100 and/or architecture 200 that is/are configured to perform the steps, functions and/or operations of the method 500. Similarly, in one example, the steps, functions, or operations of method 500 may be performed by a processing system comprising one or more computing devices collectively configured to perform various steps, functions, and/or operations of the method 500. For instance, multiple instances of the computing device or processing system 600 may collectively function as a processing system. For illustrative purposes, the method 500 is described in greater detail below in connection with an example performed by a processing system. The method 500 begins in step 505 and proceeds to step 510.

At step 510, the processing system, e.g., a first stream processing system in a region of a telecommunication network that includes at least a first zone and a second zone, obtains at least one policy for processing trace data of a first plurality of virtual network functions of the first zone and a second plurality of virtual network functions in the second zone. For instance, the at least one policy may be obtained from a probe configuration service element of the telecommunication network.

At step 520, the first stream processing system obtains the trace data in accordance with the at least one policy. In one example, the trace data is obtained from a first data distribution platform of the telecommunication network (e.g., a data distribution platform for the region of the first stream processing system). In one example, the trace data is published in accordance with at least one topic to the first data distribution platform by at least a second stream processing system of the first zone and at least a third stream processing system of the second zone. In addition, in one example, the first plurality of VNFs publishes the trace data to a second data distribution platform of the telecommunication network in accordance with a second topic and the second plurality of VNFs publishes the trace data to the a third data distribution platform of the telecommunication network in accordance with a third topic (e.g., where the second stream processing system comprises a subscriber to the second topic and the third processing system comprises a subscriber to the third topic).

At step 530, the first stream processing system processes the trace data in accordance with the at least one policy. For instance, step 530 may include at least one of: publishing at least a first portion of the trace data to a fourth data distribution platform of the telecommunication network in accordance with a fourth topic, or storing at least the first portion of the trace data in at least one data storage system (e.g., storage element(s)) of the telecommunication network. In one example, step 530 may alternatively or additionally include processing the trace data to generate performance indicators (e.g., KPIs), aggregate, generate logs, apply filtering, joining, transformation, etc., and adding this information into the trace data.

At optional step 540, the first stream processing system obtains at least a portion of a structured streaming query (broadly, a trace data request).

At optional step 550, the first stream processing system processes (e.g., executes and/or fulfills) the at least the portion of the structured streaming query. For instance, as described above, a structured streaming query may be parsed to generate sub-queries that may be distributed to one or more stream components. Thus, the structured streaming query may be processed, at least in part, by the first stream processing system (and in one example, alternatively or in addition, by one or more other stream processing systems). For instance, the first stream processing system may provide partial results on queried/requested trace data as it is obtained from the first data distribution platform.

Following step 530, or one of the optional steps 540 or 550, the method 500 proceeds to step 595 where the method 500 ends.

It should be noted any of the example methods 300, 400, and/or 500 may be expanded to include additional steps, or may be modified to replace steps with different steps, to combine steps, to omit steps, to perform steps in a different order, and so forth. For instance, in one example the first stream processing system may repeat one or more steps of the method 300, such as steps 310-350 to obtain a different policy for the same or different VNF(s), to obtain and forward trace data in accordance with the new policy, and so forth. Similarly, in one example, the processing system may repeat one or more steps of the method 400, such as steps 410-440 with respect to a different policy for the same or different (VNFs), the same or different zones, the same or different topic(s), and so forth. In still another example, the first stream processing system may repeat one or more steps of the method 500, such as steps 510-530 with respect to a different policy for trace data from the same or different VNFs, for the same or different zones of the telecommunication network, and so forth.

In one example, aspects of, or the entireties of methods 300, 400, and/or 500 may be combined. For instance, in one example, a processing system may include a zone stream processing system and a regional stream processing system (and/or a stream processing system from any additional hierarchical level/layer). In such an example, a combined method may include functions of stream processing systems at both (or several) levels/layers. In addition, any one or more of methods 300, 400, and/or 500 may be expanded to include operations of a configuration service element, such as registering VNFs (e.g., obtaining .proto definition files), configuring VNFs to collect, gather, generate, tag, forward, or otherwise process trace data (including packets and/or logs, events, performance indicators, or the like) according to policies, transmitting probe functionality failover configuration instructions for VNFs and/or probe VNFs, and so forth. Thus, these and other modifications are all contemplated within the scope of the present disclosure.

In addition, although not expressly specified above, one or more steps of the methods 300, 400, and/or 500 may include a storing, displaying and/or outputting step as required for a particular application. In other words, any data, records, fields, and/or intermediate results discussed in the method(s) can be stored, displayed and/or outputted to another device as required for a particular application. Furthermore, operations, steps, or blocks in FIGS. 3-5 that recite a determining operation or involve a decision do not necessarily require that both branches of the determining operation be practiced. In other words, one of the branches of the determining operation can be deemed as an optional step. However, the use of the term "optional step" is intended to only reflect different variations of a particular illustrative embodiment and is not intended to indicate that steps not labelled as optional steps to be deemed to be essential steps. Furthermore, operations, steps or blocks of the above described method(s) can be combined, separated, and/or performed in a different order from that described above, without departing from the example embodiments of the present disclosure.

FIG. 6 depicts a high-level block diagram of a computing system 600 (e.g., a computing device, or processing system) specifically programmed to perform the functions described herein. For example, any one or more components or devices illustrated in FIG. 1 or FIG. 2, or discussed in connection with the example methods of FIGS. 3-5 may be implemented as the computing system 600. As depicted in FIG. 6, the computing system 600 comprises a hardware processor element 602 (e.g., comprising one or more hardware processors, which may include one or more microprocessor(s), one or more central processing units (CPUs), and/or the like, where hardware processor element may also represent one example of a "processing system" as referred to herein), a memory 604, (e.g., random access memory (RAM), read only memory (ROM), a disk drive, an optical drive, a magnetic drive, and/or a Universal Serial Bus (USB) drive), a module 605 for processing trace data of virtual network functions of a telecommunication network via a plurality of stream processing systems, and various input/output devices 606, e.g., a camera, a video camera, storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like).

Although only one hardware processor element 602 is shown, it should be noted that the computing device may employ a plurality of hardware processor elements. Furthermore, although only one computing device is shown in FIG. 6, if the method(s) as discussed above is implemented in a distributed or parallel manner for a particular illustrative example, i.e., the steps of the above method(s) or the entire method(s) are implemented across multiple or parallel computing devices, e.g., a processing system, then the computing device of FIG. 6 is intended to represent each of those multiple computing devices. Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented. The hardware processor element 602 can also be configured or programmed to cause other devices to perform one or more operations as discussed above. In other words, the hardware processor element 602 may serve the function of a central controller directing other devices to perform the one or more operations as discussed above.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a computing device, or any other hardware equivalents, e.g., computer readable instructions pertaining to the method(s) discussed above can be used to configure a hardware processor to perform the steps, functions and/or operations of the above disclosed method(s). In one example, instructions and data for the present module or process 605 for processing trace data of virtual network functions of a telecommunication network via a plurality of stream processing systems (e.g., a software program comprising computer-executable instructions) can be loaded into memory 604 and executed by hardware processor element 602 to implement the steps, functions or operations as discussed above in connection with the example method(s). Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 605 for processing trace data of virtual network functions of a telecommunication network via a plurality of stream processing systems (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various embodiments have been described above, it should be understood that they have been presented by way of example only, and not limitation. Thus, the breadth and scope of a preferred embodiment should not be limited by any of the above-described example embodiments, but should be defined only in accordance with the following claims and their equivalents.

What is claimed is:
1. A method comprising:
obtaining, by a first stream processing system in a first zone of a telecommunication network, at least one policy for processing trace data of a plurality of virtual network functions in the first zone;
obtaining, by the first stream processing system, the trace data of the plurality of virtual network functions in the first zone, wherein the trace data is obtained from a data distribution platform of the telecommunication network, wherein the trace data is published in accordance with a topic to the data distribution platform by the plurality of virtual network functions, and wherein the first stream processing system comprises a subscriber to the topic;
forwarding, by the first stream processing system, at least a first portion of the trace data to a second stream processing system of the telecommunication network in accordance with the at least one policy, wherein the at least the first portion comprises less than all of the trace data, and wherein the second stream processing system is for a region of the telecommunication network that includes the first zone and at least a second zone, wherein the first stream processing system and the second stream processing system are components of a network probe infrastructure of the telecommunication network, wherein the network probe infrastructure comprises a hierarchy that includes a plurality of zones, the plurality of zones including the first zone and the second zone, wherein each of the plurality of zones includes a different one of a plurality of stream processing systems, wherein each of the plurality of zones is assigned to one of a plurality of regions, the plurality of regions including the region of the telecommunication network that includes the first zone and the at least the second zone, wherein the network probe infrastructure further includes at least one data storage system, wherein the at least the first portion of the trace data is forwarded by the second stream processing system and stored in the at least one data storage system, wherein the network probe infrastructure provides access to the at least the first portion of the trace data to at least one client application, wherein the at least the first portion of the trace data is accessible to the at least one client application from the at least one data storage system via a structured streaming query; and processing, by the first stream processing system, at least a portion of the structured streaming query, wherein the processing includes providing at least a second portion of the trace data to the at least one client application.

2. The method of claim 1, wherein the trace data comprises at least one of:
events;
logs;
packet copies; or
performance indicators.

3. The method of claim 1, wherein the at least one policy is obtained from a probe configuration service element of the telecommunication network.

4. The method of claim 1, wherein at least a first virtual network function of the plurality of virtual network functions provides a packet mirroring function.

5. The method of claim 1, wherein the at least one policy comprises a selection policy to forward the trace data associated with:
a specific user equipment identifier; or
a plurality of user equipment identifiers.

6. The method of claim 5, wherein the at least the first portion of the trace data is associated with the specific user equipment identifier or the plurality of user equipment identifiers.

7. The method of claim 1, wherein the at least one policy comprises a sampling policy, wherein the at least the first portion of the trace data is selected in accordance with the sampling policy.

8. The method of claim 1, wherein the at least one policy comprises a tagging policy, wherein the at least the first portion of the trace data is tagged with at least one tag in accordance with the tagging policy.

9. The method of claim 8, wherein the second stream processing system processes the at least the first portion of the trace data in accordance with the at least one tag.

10. The method of claim 1, further comprising:
processing the trace data in accordance with the at least one policy, wherein the processing includes generating at least one performance indicator stream from the trace data.

11. The method of claim 10, further comprising:
adding the at least one performance indicator stream to the trace data, wherein the at least the first portion of the trace data that is forwarded to the second stream processing system includes the at least one performance indicator stream.

12. The method of claim 1, further comprising:
processing the trace data in accordance with the at least one policy, wherein the processing includes aggregating at least one aspect of the trace data to generate aggregate data.

13. The method of claim 12, further comprising:
adding the aggregate data to the trace data, wherein the at least the first portion of the trace data that is forwarded to the second stream processing system includes the aggregate data.

14. An apparatus comprising:
a first stream processing system including at least one processor; and
a computer-readable medium storing instructions which, when executed by the first stream processing system when deployed in a first zone of a telecommunication network, cause the first stream processing system to perform operations, the operations comprising:
obtaining at least one policy for processing trace data of a plurality of virtual network functions in the first zone;
obtaining the trace data of the plurality of virtual network functions in the first zone, wherein the trace data is obtained from a data distribution platform of the telecommunication network, wherein the trace data is published in accordance with a topic to the data distribution platform by the plurality of virtual network functions, and wherein the first stream processing system comprises a subscriber to the topic;
forwarding at least a first portion of the trace data to a second stream processing system of the telecommunication network in accordance with the at least one policy, wherein the at least the first portion comprises less than all of the trace data, and wherein the second stream processing system is for a region of the telecommunication network that includes the first zone and at least a second zone, wherein the first stream processing system and the second stream processing system are components of a network probe infrastructure of the telecommunication network, wherein the network probe infrastructure comprises a hierarchy that includes a plurality of zones, the plurality of zones including the first zone and the second zone, wherein each of the plurality of zones includes a different one of a plurality of stream processing systems, wherein each of the plurality of zones is assigned to one of a plurality of regions, the plurality of regions including the region of the telecommunication network that includes the first zone and the at least the second zone, wherein the network probe infrastructure further includes at least one data storage system, wherein the at least the first portion of the trace data is forwarded by the second stream processing system and stored in the at least one data storage system, wherein the network probe infrastructure provides access to the at least the first portion of the trace data to at least one client application, wherein the at least the first portion of the trace data is accessible to the at least one client application from the at least one data storage system via a structured streaming query; and
processing at least a portion of the structured streaming query, wherein the processing includes providing at least a second portion of the trace data to the at least one client application.

15. A non-transitory computer-readable medium storing instructions which, when executed by a first stream processing system including at least one processor when deployed in a first zone of a telecommunication network, cause the first stream processing system to perform operations, the operations comprising:
obtaining at least one policy for processing trace data of a plurality of virtual network functions in the first zone;
obtaining the trace data of the plurality of virtual network functions in the first zone, wherein the trace data is obtained from a data distribution platform of the telecommunication network, wherein the trace data is published in accordance with a topic to the data distribution platform by the plurality of virtual network functions, and wherein the first stream processing system comprises a subscriber to the topic;
forwarding at least a first portion of the trace data to a second stream processing system of the telecommunication network in accordance with the at least one policy, wherein the at least the first portion comprises less than all of the trace data, and wherein the second stream processing system is for a region of the telecommunication network that includes the first zone and at least a second zone, wherein the first stream processing system and the second stream processing system are components of a network probe infrastructure of the telecommunication network, wherein the network probe infrastructure comprises a hierarchy that includes a plurality of zones, the plurality of zones including the first zone and the second zone, wherein each of the plurality of zones includes a different one of a plurality of stream processing systems, wherein each of the plurality of zones is assigned to one of a plurality of regions, the plurality of regions including the region of the telecommunication network that includes the first zone and the at least the second zone, wherein the network probe infrastructure further includes at least one data storage system, wherein the at least the first portion of the trace data is forwarded by the second stream processing system and stored in the at least one data storage system, wherein the network probe infrastructure provides access to the at least the first portion of the trace data to at least one client application, wherein the at least the first portion of the trace data is accessible to the at least one client application from the at least one data storage system via a structured streaming query; and processing at least a portion of the structured streaming query, wherein the processing includes providing at least a second portion of the trace data to the at least one client application.

16. The non-transitory computer-readable medium of claim 15, wherein the trace data comprises at least one of:
  events;
  logs;
  packet copies; or
  performance indicators.

17. The non-transitory computer-readable medium of claim 15, wherein the at least one policy is obtained from a probe configuration service element of the telecommunication network.

18. The non-transitory computer-readable medium of claim 15, wherein at least a first virtual network function of the plurality of virtual network functions provides a packet mirroring function.

19. The non-transitory computer-readable medium of claim 15, wherein the at least one policy comprises a selection policy to forward the trace data associated with:
  a specific user equipment identifier; or
  a plurality of user equipment identifiers.

20. The non-transitory computer-readable medium of claim 19, wherein the at least the first portion of the trace data is associated with the specific user equipment identifier or the plurality of user equipment identifiers.

* * * * *